United States Patent
Diggle, III et al.

(10) Patent No.: US 7,077,612 B1
(45) Date of Patent: Jul. 18, 2006

(54) SPLIT P-HOOK

(75) Inventors: Frederick James Diggle, III, Birmingham, AL (US); Knox Lamar Faulkner, Sterrett, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 35 days.

(21) Appl. No.: 10/646,006

(22) Filed: Aug. 22, 2003

(51) Int. Cl.
*F16B 45/00* (2006.01)

(52) U.S. Cl. ..................... 411/400; 248/303

(58) Field of Classification Search .......... 411/400, 411/401; 248/304, 217.4, 303; 135/118; 52/680
See application file for complete search history.

(56) References Cited

U.S. PATENT DOCUMENTS

| | | | |
|---|---|---|---|
| 83,913 A | 11/1868 | Bradley | |
| RE9,440 E | 11/1880 | Judd | |
| 279,113 A | 6/1883 | Clow | |
| 304,618 A | 9/1884 | Cullen | |
| 306,874 A | 10/1884 | Thatcher | |
| 415,181 A | 11/1889 | Wilcox | |
| 427,642 A * | 5/1890 | Wack | 248/353 |
| 472,948 A * | 4/1892 | Gorton | 248/217.4 |
| 479,058 A * | 7/1892 | Corscaden | 248/217.4 |
| 543,121 A | 7/1895 | Bates | |
| 601,849 A | 4/1898 | Aiken | |
| 682,753 A | 9/1901 | Teele | |
| 908,320 A * | 12/1908 | Page | 248/304 |
| 975,235 A | 11/1910 | Hansen | |
| 1,057,448 A * | 4/1913 | Nordstrom | 248/304 |
| 1,242,122 A * | 10/1917 | Apel | 248/217.4 |
| 1,313,795 A | 8/1919 | Davis | |
| 1,491,203 A * | 4/1924 | Enoch | 248/217.4 |
| 1,518,900 A * | 12/1924 | Colbert | 139/92 |
| 1,610,082 A * | 12/1926 | Francis | 52/680 |
| 1,736,707 A | 11/1929 | Lake | |
| 1,779,339 A | 10/1930 | Sokoloff | |
| 1,798,468 A | 3/1931 | Hartzler et al. | |
| 1,953,860 A | 4/1934 | Kraatz | |
| 2,043,716 A | 6/1936 | Sloan | |
| 2,188,084 A | 1/1940 | Kuckuck | |
| 2,257,640 A | 9/1941 | Muller | |
| 2,307,348 A | 1/1943 | Anderson | |
| 2,697,857 A | 12/1954 | Eckel | |
| 3,061,835 A | 11/1962 | Hain | |
| 3,088,361 A | 5/1963 | Hallock | |
| 3,178,971 A | 4/1965 | Bachli | |
| 3,298,459 A | 1/1967 | Bergsten | |
| 3,341,651 A | 9/1967 | Odegaard | |
| 3,483,790 A | 12/1969 | Matthews | |
| 3,690,536 A | 9/1972 | Bakoledis | |
| 3,848,080 A | 11/1974 | Schmidt | |

(Continued)

OTHER PUBLICATIONS

U.S. Appl. No. 10/646,204, filed Aug. 22, 2003.

(Continued)

*Primary Examiner*—Flemming Saether
(74) *Attorney, Agent, or Firm*—Withers & Keys, LLC

(57) ABSTRACT

A support device and method of manufacturing the same is disclosed. The support device has two ends with the first end adapted for engaging a pole and the second having two support members. The support members are utilized, for example, for securing a person and equipment to the utility pole. The support device may be manufactured from steel rod stock where one end is split creating two parallel sides that are then bent into the support members.

6 Claims, 4 Drawing Sheets

U.S. PATENT DOCUMENTS

| | | |
|---|---|---|
| 3,934,802 A | 1/1976 | Jennings |
| 4,018,023 A | 4/1977 | Anderson |
| 4,068,790 A | 1/1978 | Osterle et al. |
| 4,157,001 A | 6/1979 | Pickles |
| 4,289,058 A | 9/1981 | Paskert |
| 4,413,706 A | 11/1983 | Michael |
| 4,438,769 A | 3/1984 | Pratt |
| 4,449,612 A | 5/1984 | Southard |
| 4,479,599 A | 10/1984 | Conrad |
| 4,655,380 A | 4/1987 | Haytayan |
| 4,655,423 A | 4/1987 | Schavilje |
| 4,697,669 A | 10/1987 | Bergsten |
| 4,830,254 A | 5/1989 | Hsu |
| 4,979,858 A | 12/1990 | Van Allman et al. |
| 5,062,753 A | 11/1991 | Begue |
| 5,135,150 A | 8/1992 | Chun |
| 5,207,404 A | 5/1993 | Reinhard |
| 5,269,450 A | 12/1993 | Popvich et al. |
| 5,279,388 A | 1/1994 | Laughlin et al. |
| 5,417,534 A | 5/1995 | Losada |
| 5,513,935 A | 5/1996 | Sharber et al. |
| 5,549,234 A | 8/1996 | Hong |
| 5,606,832 A | 3/1997 | Keith et al. |
| 5,624,007 A | 4/1997 | Mahaffy |
| 5,881,837 A | 3/1999 | Leicht |
| 5,887,677 A | 3/1999 | Malmgren |
| 5,899,124 A | 5/1999 | Cross, Jr. |
| 5,944,139 A | 8/1999 | Kozial |
| 5,967,475 A | 10/1999 | Johnson |
| 6,126,055 A | 10/2000 | Gantner et al. |
| 6,439,343 B1 | 8/2002 | Jorges et al. |
| 6,484,888 B1 * | 11/2002 | Miller .................. 211/5 |
| 6,585,142 B1 | 7/2003 | Chen |
| 6,726,162 B1 | 4/2004 | Winter |
| 6,729,437 B1 | 5/2004 | Apple |
| 6,872,042 B1 | 3/2005 | Panasik et al. |
| 6,918,222 B1 * | 7/2005 | Lat et al. .............. 52/680 |
| 2002/0098062 A1 | 7/2002 | Beale et al. |
| 2002/0121406 A1 | 9/2002 | Summers |
| 2003/0140739 A1 | 7/2003 | McKivigan |
| 2004/0064932 A1 | 4/2004 | Sprague |
| 2004/0099300 A1 | 5/2004 | Warren |
| 2004/0129496 A1 | 7/2004 | Clark |

OTHER PUBLICATIONS

U.S. Appl. No. 10/646,068, filed Aug. 22, 2003.
U.S. Appl. No. 10/687,151, filed Oct. 16, 2003.
U.S. Appl. No. 10/643,177, filed Aug. 18, 2003.

* cited by examiner

SPLIT P-HOOK

BACKGROUND

The invention, in various embodiments, relates generally to devices and methods for their manufacture and use in working on, for example, utility poles.

In the telecommunications or electronics industry, it is common practice for a technician (also referred to as a "linesman") to scale a utility pole. The technician scales the utility pole to install equipment, to repair broken or damaged communications equipment, to test equipment, and/or for other work-related reasons. To safely and effectively scale a pole and perform line work, the technician must maintain and properly utilize various types of scaling and safety equipment. To utilize the various types of scaling and safety equipment, the technician must also have the skills and the physical ability to sustain a great strain on their legs and back while the technician climbs and/or maintains a position about the pole.

Conventional climbing equipment employed by a technician typically includes a pair of gaffs, a body belt, and/or a safety strap. In general, the gaff is a sharp blade protruding from the inside of the foot about mid-foot level and having straps that secure about the leg and/or feet of a technician. To climb, the technician drives one of the gaffs into the pole, steps up onto the gaff, and then drives the other gaff into the pole at a higher position. The technician continues taking steps up or "gaffs up" the pole until reaching a desired height.

The body belt is secured around the waist of the technician. The body belt includes pockets for carrying tools and rings (e.g., "D-rings") for attaching the safety strap. The safety strap typically includes a hook (e.g., snap buckle) at each end and a buckle for adjusting its length. During climbing, both hooks of the safety strap are attached to the same ring of the body belt on the left hip. Once in a position to perform line work, the technician releases one end of the safety strap from the body belt. The technician then wraps the safety strap around the pole and reattaches the end of the safety strap to the body belt, thus allowing the technician to use his hands at the desired working elevation. Thus, the technician uses the safety strap for climbing as well as supporting the technician in his working position about the pole.

During elevated line work, both gaffs are pressed into the pole and the technician leans back against the safety strap. This position allows the weight of the technician to be supported by the gaffs and the tension in the safety strap.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

SUMMARY

In one aspect of the present invention, a securing device is described. The securing device has a rigid shank having a first end and a second end and threads disposed at the first end of the shank for use in securing the device to a pole. The device also includes a rigid first support member disposed on the second end of the shank for securing a first object to the pole. Further, the device includes a rigid second support member disposed on the second end of the shank for securing a second object to the pole.

Embodiments of a method for manufacturing a support device comprising dividing a metal shank thereby creating a first end portion and a second end portion is described. The method comprises creating a first support member by bending the first end portion initially perpendicularly and then radially away from the metal shank. The method also includes the step of creating a second support member by bending said second end portion initially perpendicularly and then radially away from said metal shank in a direction approximately opposite that of said first support member.

In another aspect of the present invention, a securing device comprising a rigid shank having a first and second end is described. The device comprises a means for securing the device to a pole disposed at the first end of the shank. The device further comprises a first support means disposed on the second end of the shank for securing a first object to the pole. Further, the device includes a second support means disposed on the second end of the shank for securing a second object to the pole.

DESCRIPTION

U.S. application Ser. No. 10/643,177 filed Aug. 18, 2003 entitled "Support Device," which is incorporated herein by reference, discloses a support device that is manufactured, in one embodiment, by adding support members to a shank or casting an entire device in the desired shape. Various embodiments of the present invention permit ordinary steel or alloyed rod stock to be used in creating the support device, thereby potentially reducing manufacturing costs while producing an effective support device.

Figures 1, 2:
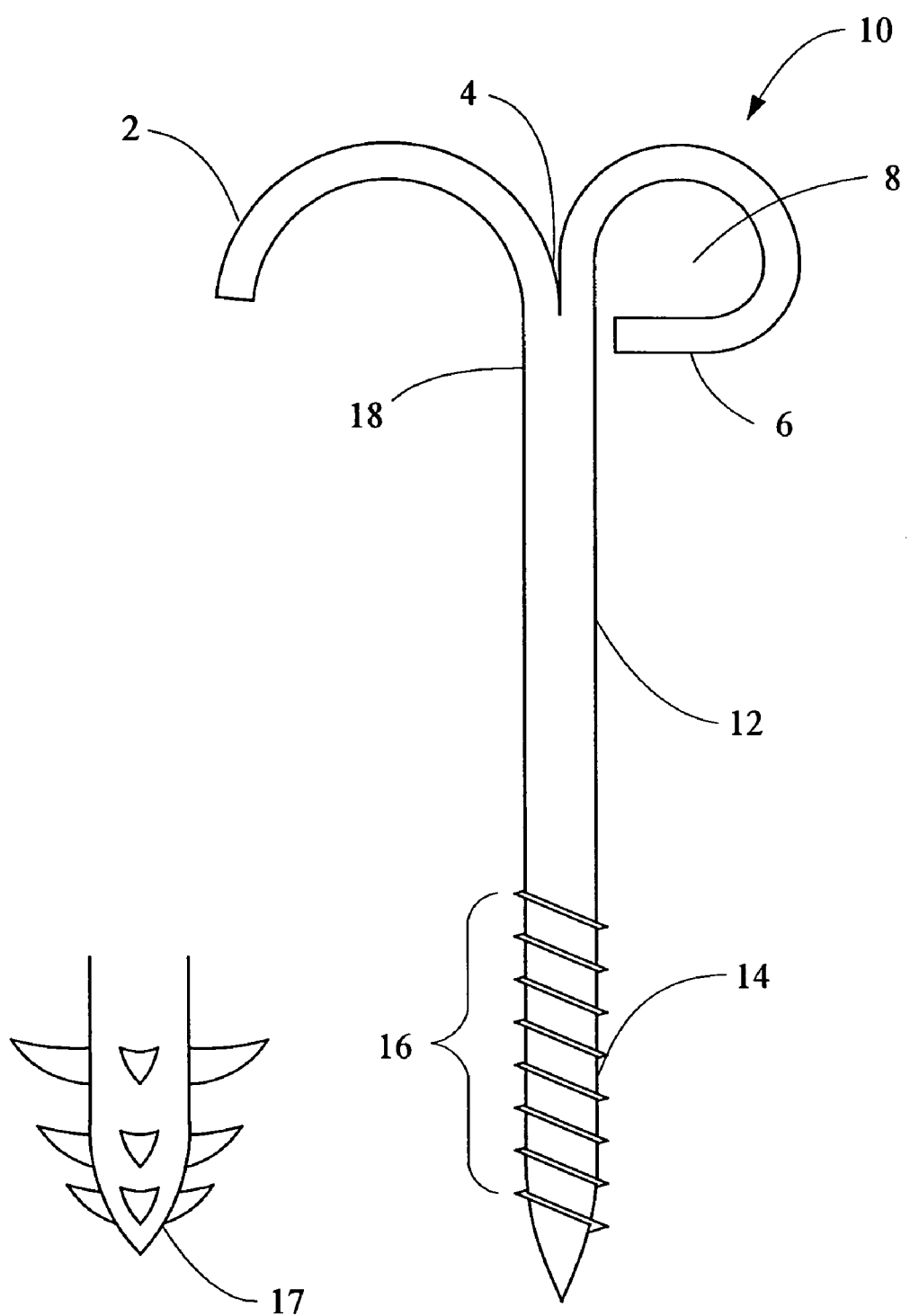
FIGS. 1–4 are schematics showing various embodiments of a support device.
Figure 3:
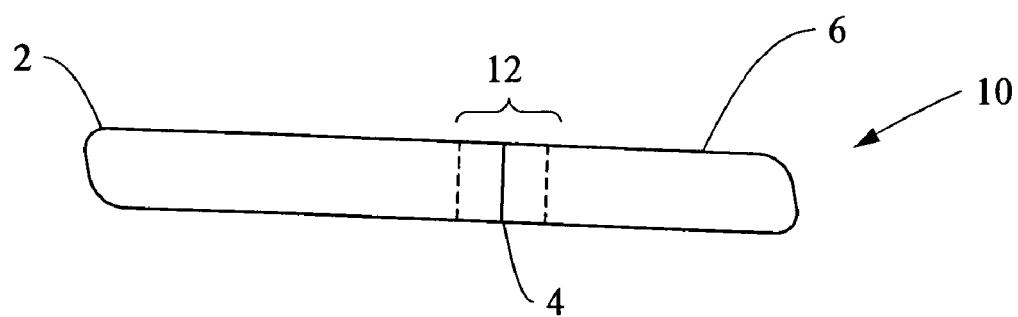
Figure 4:
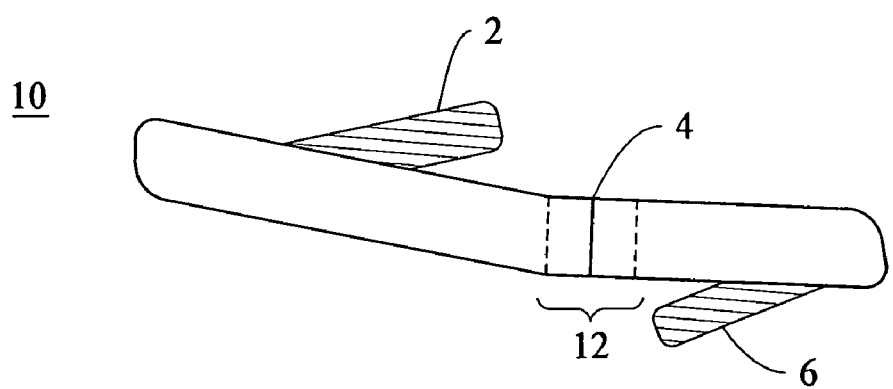

FIG. 1 illustrates an embodiment of a support device 10. The support device 10 has a shank 12 that has a first end 14 and a second end 18. A first support member 2 and a second support member 6 extend outwardly from the shank 12. The shank 12, first support member 2 and second support member 6, in one embodiment, have a co-planar relationship as depicted in FIG. 3. The shank 12, first support member 2 and second support member 6 may alternatively have a non-planar relationship as depicted in FIG. 4. The first end 14 of the shank 12 may have a threaded portion 16 for securing the shank into a utility pole, tree trunk, wall, rock face or any other vertical or columnar object, member or structure capable of receiving a support device as described herein. It can be appreciated that the threads 14 may be replaced with any securing means to retain the shank in a utility pole or structure, such as barbs or teeth 17 disposed about the first end 14 as illustrated in FIG. 2.

Figure 5:
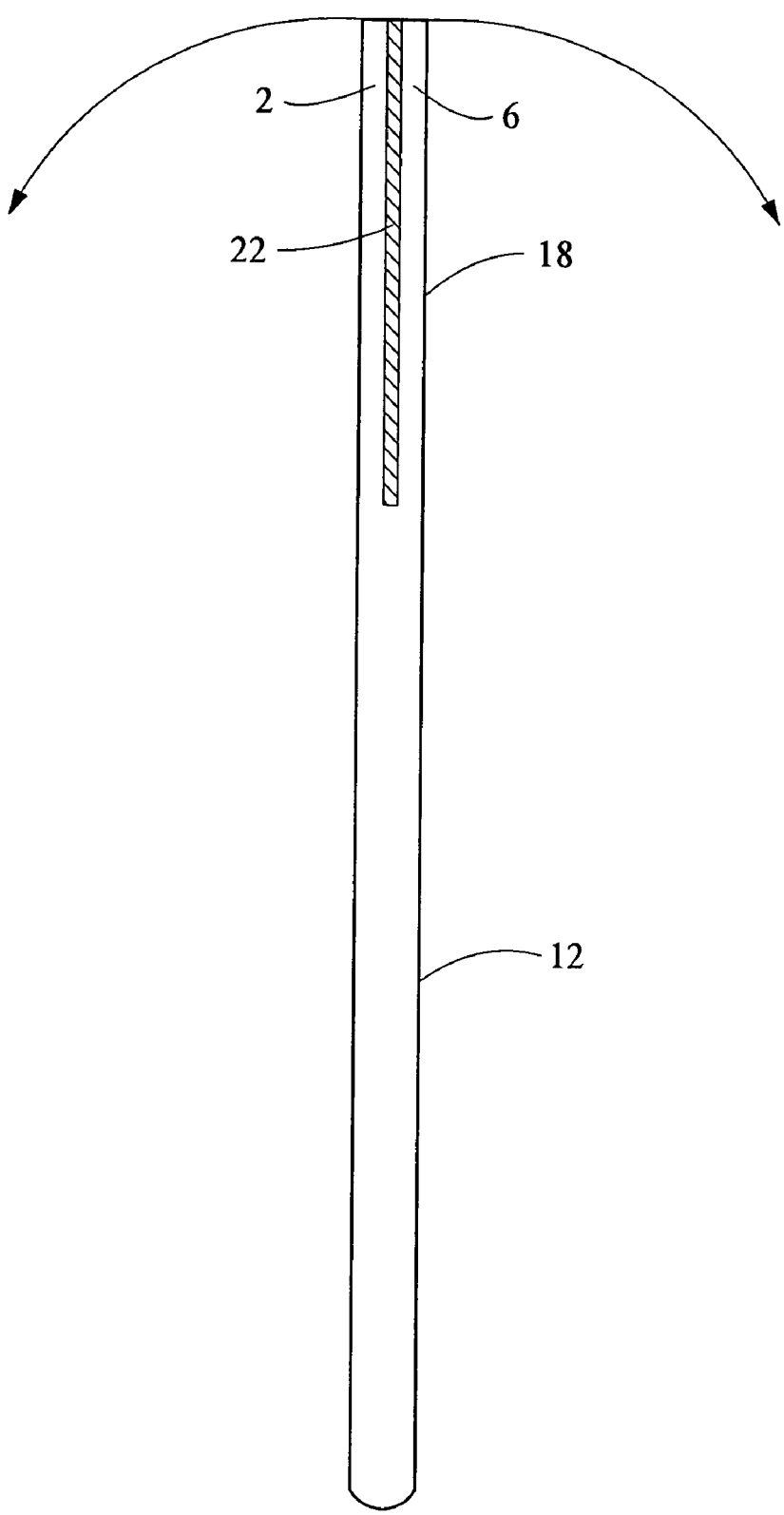
FIG. 5 is a schematic showing rod stock after splitting but before bending.

The support members 2 and 6 described above may be formed, in one embodiment, by splitting the second end 18 of the shank 12 by any means suitable for splitting a metal or alloy. These may include, for example, punching a section 22 out of the end 18, as depicted in FIG. 5, and then bending support members 2 and 6 into the desired shape by any means known in the metal working art. In another example, the support members 2 and 6 may be formed by cutting the end 18 into two sections by, for example, a bandsaw specially adapted for cutting metals or any other means known in the metalworking art.

After forming the support members 2 and 6, it may be necessary to apply metallurgical techniques to the support device 10 to achieve the desired strength and rigidity. In one example, the fully formed support device 10 may be stress-relief annealed to improve its metallurgical qualities.

Figure 6:
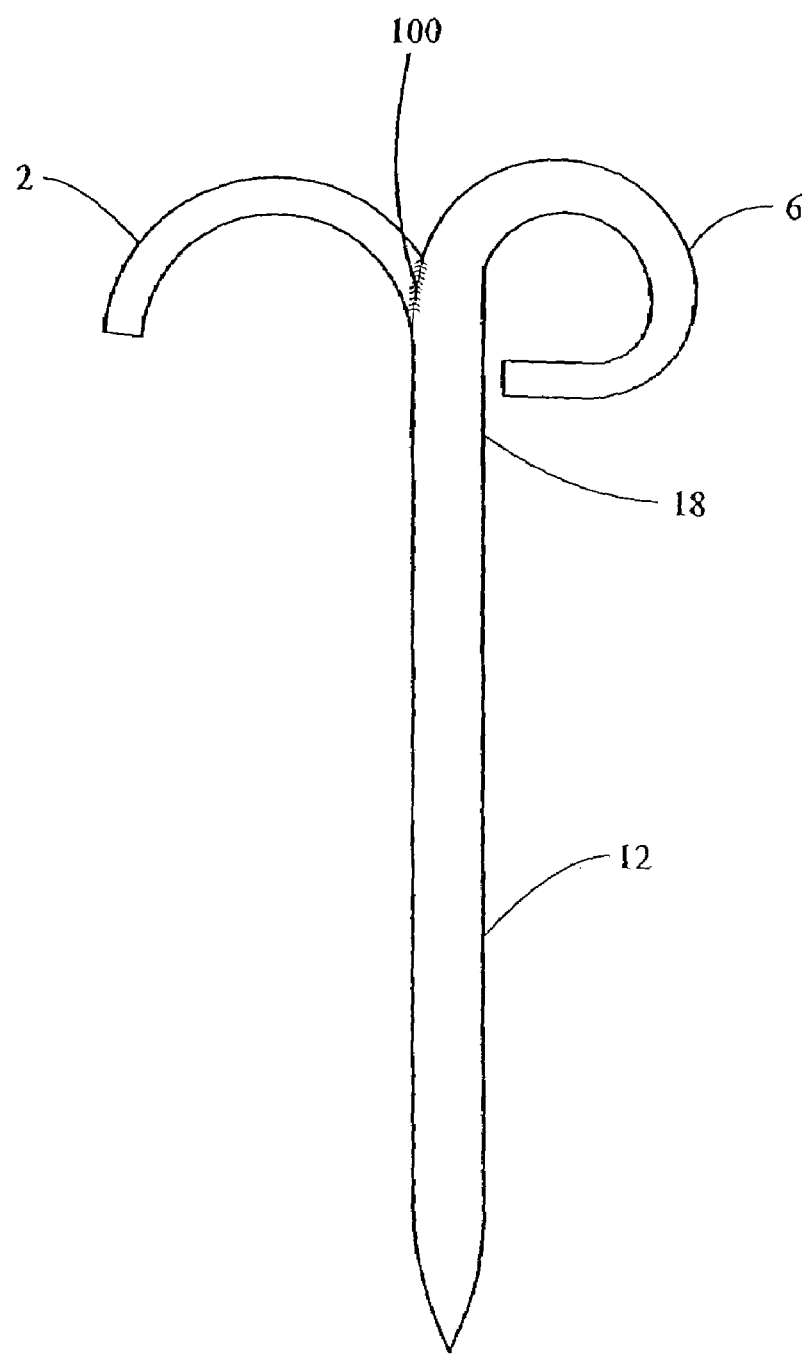
FIG. 6 illustrates an embodiment of a support device.

FIG. 6 depicts another embodiment of the support device 10. In this embodiment, support member 6 is formed by bending the second end 18 of shank 12 into the desired shape creating a single support member 6. A second support member 2 is then attached to the second end of the shank, in one embodiment, via a spot-weld 100. It can be appreciated that the second support member may be attached via any means known to those skilled in the metalworking art, including, for example, a mechanical attachment.

Materials for the shank disclosed herein may include, where appropriate and suitable for the reasonably safe and functional practice of the various embodiments described herein, one or more of the following materials: metals such as steel, aluminum, for example, titanium and/or stainless steel or any other metal or alloy capable of withstanding stress and strain. It can be appreciated that the choice of materials for construction of the various structural elements disclosed herein may be driven, at least in part, by the motivation to create an apparatus that is relatively lightweight, relatively compact and structurally sound and suitable for supporting items as intended during use of such an apparatus.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular support bracket, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A securing device comprising:
   a rigid shank having a first end and a second end;
   threads set into the exterior of the first end of the shank for inserting and securing the first end into a surface;
   a rigid first support member, having a proximate end and a distal end, the proximate end being attached to the second end of the shank and the distal end being blunt; and
   a rigid second support member, having a proximate end and a blunt distal end, the proximate end being attached to the second end of the shank wherefrom the second support member is initially bent perpendicularly to the shank in a direction substantially opposite the first support member and circularly towards the shank forming a partial loop wherein the partial loop terminates with a straight residual portion of the distal end in a position pointing towards, perpendicular to, and in the same plane as the shank leaving a gap between the distal end and the shank.

2. The device of claim 1, wherein the shank, first support member and second support member are disposed in the same plane.

3. The device of claim 1, wherein the first support member and the shank are located in the same plane.

4. The device of claim 1, wherein the shank and first support member form a J shape.

5. The device of claim 1, wherein the shank and second support member form a P shape.

6. A securing device comprising:
   a rigid shank having a first end with a tip and a second end;
   means for securing the device into a surface formed on the outer surface of the tip of the first end of the shank;
   a first support means disposed on the second end of the shank for securing a first object to the shank; and
   a second support means disposed on the second end of the shank for securing a second object to the shank wherein the second support means has a proximate end and a blunt distal end, the proximate end being attached to the second end of the shank wherefrom the second support means is initially bent perpendicularly to the shank in a direction substantially opposite the first support member and circularly towards the shank forming a partial loop wherein the partial loop terminates with a straight residual portion of the distal end in a position pointing towards, perpendicular to, and in the same plane as the shank leaving a gap between the distal end and the shank.

* * * * *